United States Patent Office 2,721,104
Patented Oct. 18, 1955

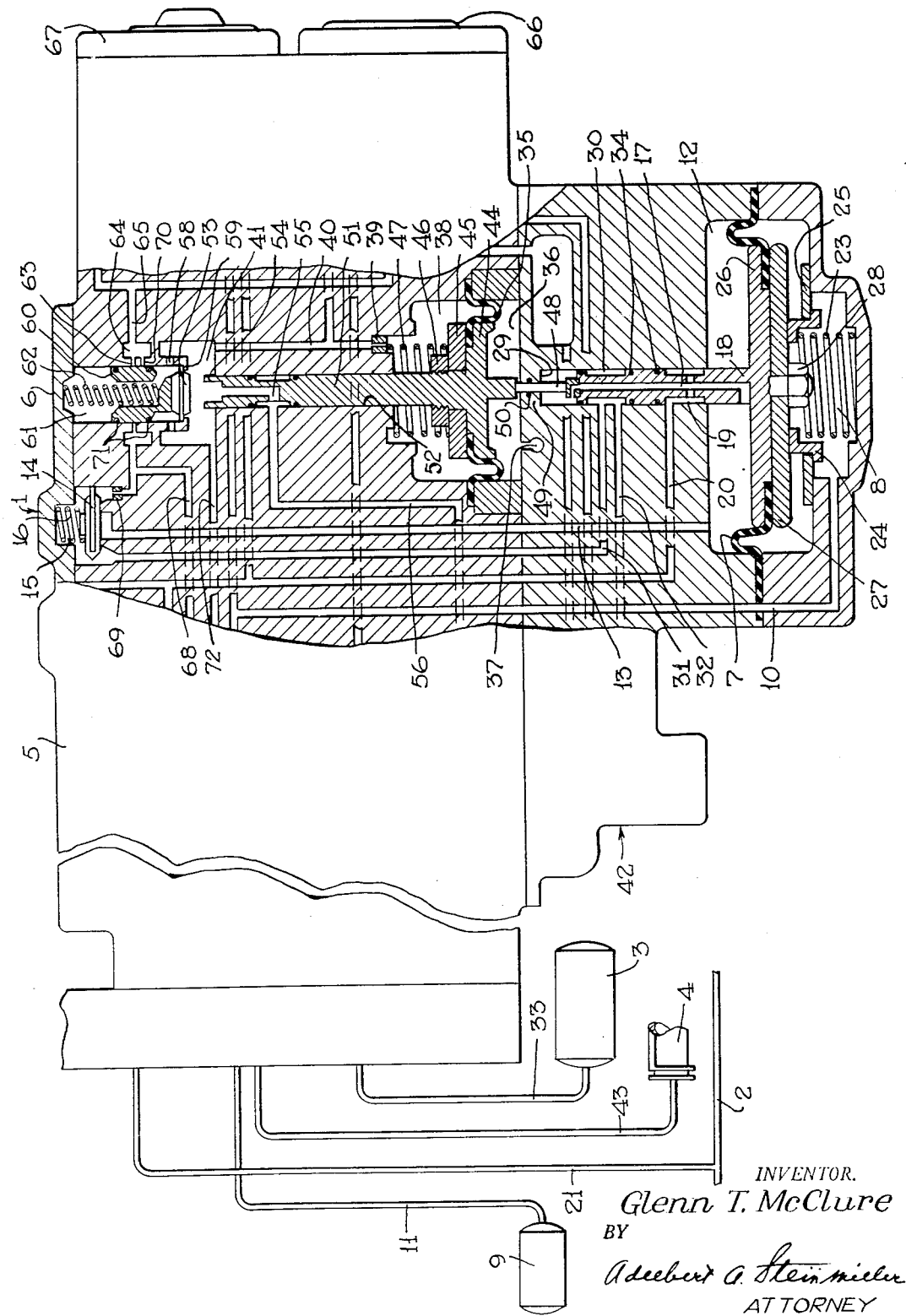

2,721,104

FLUID PRESSURE BRAKE APPARATUS

Glenn T. McClure, McKeesport, Pa., assignor to Westinghouse Air Brake Company, Wilmerding, Pa., a corporation of Pennsylvania Application November 5, 1953, Serial No. 390,319

5 Claims. (Cl. 303—60)

This invention relates to fluid pressure brake equipment for railway vehicles controlled by variations in fluid pressure in a brake pipe and more particularly to means for maintaining the braking force at a selected degree regardless of the leakage of fluid under pressure from the several brake cylinder devices in the train.

The brake equipment for which this invention is an improvement employs a brake controlling valve device of the graduated application and graduated release type having an equalizing diaphragm assemblage which is subject in one direction to pressure of fluid in a control reservoir which is balanced by pressure of fluid in a brake pipe and pressure of fluid in a brake cylinder device acting in the opposite direction. Thus, when a reduction in brake pipe pressure is effected, control reservoir pressure will operate a valve means through the medium of the diaphragm assemblage to supply fluid under pressure to a brake cylinder device until a pressure is established in the brake cylinder device which is effective in restoring equilibrium in the forces acting on the diaphragm assemblage, the brake cylinder pressure thus obtained corresponding to the degree of brake pipe reduction. When the pressure of fluid in the brake pipe is restored, such pressure will operate the valve means acting through the medium of the diaphragm assemblage to vent the fluid under pressure in the brake cylinder device to effect a release of the brakes. If brake pipe pressure is only partially restored, the pressure in the brake cylinder device will be correspondingly reduced in an amount sufficient to restore the aforesaid equilibrium. Such a brake controlling valve device is shown and described in patent application, Serial No. 388,189, filed by Glenn T. McClure, October 26, 1953, and assigned to the assignee of the present invention.

One object is to provide an improved and novel brake controlling valve device of the graduated release type.

Another object is to provide novel means in a brake controlling valve device of the above described type which will maintain a supply of fluid under pressure to the auxiliary reservoir from the brake pipe while the leakage in the brake cylinder device is being compensated for by fluid under pressure from the auxiliary reservoir.

Other objects and advantages will become apparent from the following more detailed description of the invention.

In the accompanying drawing, the single figure is a diagrammatic view, partly in section and partly in outline, of a fluid pressure brake controlling valve device embodying the invention.

*Description*

As shown in the drawing, the brake equipment embodying the invention comprises a brake controlling valve device 1 adapted to operate in response to a reduction in pressure in a brake pipe 2 to control supply of fluid under pressure from an auxiliary reservoir 3 to a brake cylinder device 4 to apply brakes on a car and adapted to operate in response to charging of said brake pipe with fluid under pressure to charge said auxiliary reservoir with fluid under pressure and to release fluid under pressure from said brake cylinder device.

The brake controlling valve device 1 comprises a casing 5 containing a graduated control portion 6 which comprises a diaphragm 7 clamped about its periphery between two sections of said casing and combined with said casing to define at one side a chamber 8, which is connected to a control reservoir 9 by way of a passage 10 and a pipe 11, and to define at the other side a chamber 12 which is open by way of a passage 13 to the seated area of an auxiliary reservoir charging check valve 14 contained in a chamber 15 and urged toward its seated position by a spring 16 contained in the chamber 15. Chamber 12 is also connected by way of a passage 17 formed in a follower stem 18, a chamber 19 formed in said stem, a passage 20 and a pipe 21 to the brake pipe 2. A spring 23 is mounted in chamber 8 between a portion of the casing 5 and a spring seat member 24 slidably mounted in a stop member 25. As will appear more fully later, the stop member 25 serves to limit the downward movement of diaphragm 7 against the force of spring 23 in response to an excess in pressure of fluid supplied to chamber 9 from the brake pipe 15.

The follower stem 18 has formed integral therewith in chamber 12 a follower plate 26 and extends downwardly therefrom, as viewed in Fig. 1, through a central opening in diaphragm 7 into chamber 8, where it makes screw-threaded connection with a follower plate 27 and a locking nut 28 for clamping the central portion of said diaphragm.

Extending upwardly from the follower plate 26 the follower stem 18 is slidably mounted in a bore 29 formed in the casing 5 and is reduced at two places to define within said bore the annular chamber 19 previously described and an annular chamber 30 which is always connected by way of passage 31 to chamber 15 containing auxiliary reservoir charging check valve 14 and may be connected through a passage 32 and a pipe 33 to the auxiliary reservoir 3. Intermediate chambers 19 and 30 a pair of sealing rings 34 are slidably mounted between the stem 18 and the wall of the bore 29 to prevent leakage of fluid under pressure between said chambers.

The graduated control portion 6 further comprises a diaphragm 35 clamped about its periphery between two sections of the casing 5 and combining with said casing to define at one side a chamber 36 which is open to atmosphere by way of a vent port 37 and at the other side a chamber 38 which is open through a choke 39 to a passage 40 leading to a valve chamber 41 which is connected to the brake cylinder device 4 by way of an inshot valve portion 42 and a pipe 43. The diaphragm 35 is clamped at its center between a follower 44 which extends through a central opening in said diaphragm and a follower plate 45 and makes screw-threaded connection with a nut 46 in chamber 38. A spring 47 is mounted in chamber 38 between a wall of the casing 5 and the follower plate 45 for urging the diaphragm 35 downwardly toward the position in which it is shown in the drawing. This position is normal release position and is defined by contact of the follower plate 27 with the spring-pressed spring seat 24 which is effective through the medium of a pusher stem 48 extending through a suitable opening in a wall 49 between the upper end of bore 29 and chamber 35, and abutting follower stem 18 at its lower end and follower 44 at its upper end to define normal release position of diaphragm 7. A sealing ring 50 is mounted in a groove in the wall 49 and encircles the pusher stem 48 to prevent leakage of fluid under pressure from bore 29 to atmospheric chamber 36.

The diaphragm follower 44 has formed integral therewith a follower stem 51 which extends upwardly through the chamber 38 and a suitable bore 52 in the casing 5, in which it is slidably mounted, into chamber 41 where its upper end may engage a valve 53 contained therein. The upper end of stem 51 is provided with an annular valve seat 54, which seat encircles a longitudinal passage 55 in said stem, which passage constantly registers with an atmospheric passage 56. Thus, chamber 41 which is normally open to atmosphere, will be closed off from atmosphere upon upward movement of follower stem 51 and sealing engagement of valve seat 54 with valve 53. A pair of sealing rings 57 are mounted in suitable grooves in the stem 51 at opposite sides of passage 55 so as to make sealing contact with the casing 5 and prevent leakage of fluid under pressure from chambers 41 and 38 to said passage. The valve 53 is disposed within a depending tubular element 58 rigidly secured in the casing 5 in chamber 41 and is adapted to rest on an inwardly extending lip 59 at the bottom of said element. A piston valve 60 is slidably mounted in a bore 61 in coaxial alignment with element 58 and follower stems 18 and 51 and is arranged to abut the top of valve 53 and urge it downwardly under the pressure of a spring 62 operably mounted in the upper end of said bore.

A plurality of openings, or ports 63 are arranged in a circle around the wall of the bore 61 at a point intermediate its ends to connect said bore to an annular chamber 64 encircling the bore, which chamber is open at one side to a passage 65 leading to a charging valve device 66 and to a quick service valve device 67, and at the opposite side to a passage 68 which is connected through pipe 33 to auxiliary reservoir 3 and to chamber 15 through a choke 69.

As will appear more fully later, the choke 69 provides for a limited flow to the auxiliary reservoir 3 of fluid supplied from the brake pipe 2 to replenish that expended in maintaining brake cylinder pressure against leakage thereof. It will be noted that the choke 69 is connected to supply of fluid under pressure from the brake pipe 2 after it has passed the check valve 14 so that a reduction in brake pipe pressure may not directly effect a reduction in auxiliary reservoir pressure and also so that the final charging of auxiliary reservoir 3 to full brake pipe pressure may be under the control of the charging valve device 66 only.

A restricted port 70 which may also connect bore 61 to chamber 64, is spaced inwardly of the ports 63 for providing for a limited flow of fluid under pressure from the auxiliary reservoir 3 to the brake cylinder device 4 in the event of brake cylinder leakage. A pair of sealing rings 71 are mounted in suitable grooves in the piston valve 60 for sealing engagement with the wall of the bore 61 on opposite sides of ports 63 and 70 at a distance sufficient to permit closing all ports or opening the brake cylinder maintaining port 70 only.

*Operation*

In charging the brake equipment on a train the usual locomotive brake valve device (not shown) will be moved first to a release position for supplying fluid at relatively high pressure directly from the usual main reservoir on the locomotive to the brake pipe 2 at the locomotive, and then after an interval of time which varies according to different conditions, the brake valve will be moved to running position to reduce the pressure of further supply of fluid to said brake pipe to the normal degree that it is desired to maintain in running.

When fluid under pressure is supplied to the brake pipe 2 as above described, such fluid will be supplied through branch pipe 21 to passage 20 and thence through chamber 19 and passage 17 in the follower stem 18 to chamber 12 in the graduated control portion 6. Fluid under pressure thus supplied to chamber 12 will flow through passage 13 and past check valve 14 to chamber 15, the spring 16 being of such strength as to require a differential of approximately one and one-half pounds to unseat said check valve. Fluid under pressure thus supplied to chamber 15 will flow through passage 31 to chamber 30 around the piston stem 18, whence it will flow through passage 32 and pipe 33 to auxiliary reservoir 3. Fluid under pressure thus supplied to chamber 15 will also flow through choke 69 and passage 68 to auxiliary reservoir pipe 33 although, as previously stated, the primary purpose of choke 69 is to provide means for replenishing the supply to auxiliary reservoir 3 at a limited rate while the graduated control portion 6 is operating to maintain the desired brake cylinder pressure against brake cylinder leakage. Fluid under pressure supplied to brake pipe 2 will also flow through branch pipe 21 and passage 20 to the charging valve device 66, which will operate to supply fluid under pressure to the control reservoir passage 10 and, in the final stage of charging of the auxiliary reservoir 3, through passage 65 to annular chamber 64 and thence through passage 68 and pipe 33 to said auxiliary reservoir. The operation of the charging valve device 66 is fully described in the aforesaid co-pending application and since its operation forms no part of the present invention and is not essential to a full understanding of the invention, its description here will be omitted.

Upon instituting the initial charging of the brake pipe 2, the higher than normal brake pipe pressure obtained on cars adjacent the locomotive will start to rush from branch pipe 21 through passage 20, chamber 19 and passage 17 into chamber 12 and increase the pressure therein so rapidly as to create a force on diaphragm 7 which will move the diaphragm follower plate 26 and stem 18 downwardly from the position in which it is shown in Fig. 1 against the force of spring 23, which is provided to prevent overcharging of the auxiliary reservoir 3, as described below.

As the diaphragm 7 thus moves downwardly, the follower stem 18 will first tend to block off the connection of passage 20 to chamber 19 and thus to chamber 12, and on cars near the locomotive the passage 20 will actually be cut off from chamber 19. The fluid under pressure thus supplied to chamber 12, however, will be promptly dissipated through passage 13 to the auxiliary reservoir 3 as described above. As the pressure of fluid in chamber 12 decreases, by reason of the supply being cut off and the continuing flow of fluid under pressure to auxiliary reservoir 3, and the pressure of fluid in chamber 8 increases through the operation of the charging valve device 66, the follower stem 18 will gradually return to the position in which it is shown in the drawing.

Further back in the train where the brake pipe may only become charged to the normal pressure carried, the diaphragm 7 and follower stem 18 may be moved downwardly against the force of spring 23 to a position where the connection between passage 20 and chamber 19 will be sufficiently closed to so restrict supply of fluid under pressure to chamber 12 as to limit the pressure obtained therein in accordance with the increase in pressure in chamber 8.

When the locomotive brake valve device is operated to reduce the pressure of fluid supplied to the brake pipe to the normal degree, the rate of supply of fluid under pressure to chamber 12 will be correspondingly reduced and at the front end of the train the follower stems 18 will be operated by spring 23 to open the connection between passage 20 and chamber 19 to a greater degree as necessary in accordance with the reduced brake pipe pressure to maintain the balance between pressure in chambers 8 and 12. Finally, when control reservoir pressure in chamber 8 becomes increased to within a small degree, such as three pounds, of the pressure of fluid in the brake pipe, spring 23 will move the follower stem 18 to normal position, in which it is shown in the drawing, as will occur on any cars further to the rear in the train when this same relationship of pressure is obtained.

Effecting application of brakes

When it is desired to effect an application of brakes, a reduction in pressure in the brake pipe 2 will be initiated by the locomotive brake valve device in the well-known manner. When the brake pipe pressure is reduced, check valve 14 in the graduated control portion 6 will prevent back-flow of fluid under pressure from the auxiliary reservoir 3 to the brake pipe. In response to this reduction in brake pipe pressure instituted at the locomotive the quick service valve device 67 will operate in the manner described in the aforesaid co-pending application to effect a local reduction in brake pipe pressure and to utilize the pressure of fluid thus withdrawn from the brake pipe to operate the charging valve device 66 to cut off the communication between brake pipe and the auxiliary and control reservoirs as also described in said co-pending application.

When the pressure of fluid in the brake pipe is reduced as just described, a corresponding reduction in pressure will occur in chamber 12 of the graduated control portion 6, and when the pressure in said chamber thus becomes sufficiently reduced, the bottled up control reservoir pressure in chamber 8 will deflect the diaphragm 7 upwardly against the reduced brake pipe pressure and the pressure of spring 47 until the valve seat 54 formed on the end of follower stem 18 engages the valve 53, thereby cutting off valve chamber 41, which is open to brake cylinder device 4 as previously described, from atmospheric passage 55. Then when the differential in opposing pressures acting on diaphragm 7 is further increased, sufficiently to overcome the bias pressure of spring 62, the diaphragm assemblage will be moved to an application position defined by contact of the follower plate 45 with the casing, in which position fluid under pressure will be supplied from auxiliary reservoir 3 through pipe 33, passage 68, chamber 64 and ports 63, 70 to valve chamber 41, whence it will flow to a brake cylinder passage 72 and also through passage 40 and choke 39 to diaphragm chamber 38. Assuming that the reduction in brake pipe pressure effected by operation of the brake valve device is limited to some chosen degree, then when the pressure obtained in the brake cylinder device 4 and in chamber 38 is increased to a chosen relation to the degree of brake pipe reduction registered in chamber 12, the brake cylinder pressure acting in chamber 38 on diaphragm 35 will move said diaphragm and the attached follower stem 51 downwardly to a lap position in which the piston valve 60 will lap the application ports 63 and maintaining port 70. When the follower stem 18 is moved upwardly, communication between chamber 30 and auxiliary reservoir passage 32 will be cut off before valve seat 54 engages valve 53, thereby discontinuing charging of the auxiliary reservoir 3 before said reservoir is connected to brake cylinder device 4.

Now, if for some reason or other, such as brake cylinder leakage, the brake cylinder pressure should become reduced below that called for by the chosen reduction in brake pipe pressure, the control reservoir pressure in chamber 8 acting on diaphragm 7 will actuate said diaphragm and the follower stem 18 and thereby the piston valve 60 upwardly until the lower sealing ring 71 passes and the valve uncovers the maintaining port 70, whereupon fluid under pressure will flow from the auxiliary reservoir 3 to the brake cylinder device 4 by the same route as when the brake application was initially effected. This time, however, the rate of flow will be substantially reduced because of the lesser flow capacity of port 70 than ports 63. When the fluid in the brake cylinder device 4 has been restored to its proper pressure, the several elements of the graduated control portion 6 will assume the positions corresponding to lap position of said control portion, in which position both the supply and release connections to the brake cylinder device 4 and the supply connection to the auxiliary reservoir 3 by way of chamber 30 are closed off. The supply communication from brake pipe 2 to chamber 15, however, will remain open at all times under brake application conditions so that fluid under pressure supplied from brake pipe 2 to chamber 15 as previously described will flow through choke 69 to auxiliary reservoir passage 68 to replace the fluid under pressure expended therefrom through the maintaining port 70 as previously described.

If it is desired to increase the degree of brake application a further reduction in pressure in brake pipe 2 may be effected according to the desired increase in brake application. In response to the consequent reduction in pressure in chamber 12, the diaphragm 7, and connected diaphragm 35, will move upwardly to actuate the valve 60 to uncover the application ports 63, whereupon fluid will again be supplied to the brake cylinder device 4 and chamber 38 at a normal application rate and when the pressure in said brake cylinder device and chamber becomes thus increased in proportion to the degree of brake pipe reduction, the diaphragm 35 will again move the follower stems 18 and 51, and thereby valve 60, to lap position. Thus the application of brakes may be graduated on in any desired steps with the feature of maintaining brake cylinder pressure against leakage available from lap position at the termination of each step.

Release of brake application

In order to effect the release of a brake application and to recharge the brake equipment with fluid under pressure, fluid under pressure will be supplied to the brake pipe 2 and thence to chamber 12. When the pressure of fluid in chamber 12 is thus increased sufficiently, it acting on the upper side of diaphragm 7 and brake cylinder pressure in chamber 38 acting on diaphragm 35 will create a force which will overcome the opposing force created by control reservoir pressure acting on diaphragm 7 and move the diaphragms 7 and 35 downwardly. Downward movement, either from brake cylinder maintaining position or lap position, will move the several elements to the positions in which they are shown in the drawing, in which positions charging of the equipment will proceed as described in connection with initial charging. When the valve seat 54 is withdrawn from contact with valve 59, fluid under pressure in brake cylinder device 4 will flow through pipe 43, passage 72, chamber 41, passage 55 in the stem 51 and atmospheric passage 56. As the pressure of fluid in chamber 41 is thus reduced to atmospheric pressure fluid in chamber 38 will flow through choke 39 and passage 40 to chamber 41 until likewise reduced to atmospheric pressure.

Summary

From the foregoing it will now be seen that I have provided a brake controlling valve device of the graduated application and graduated release type which uses a control reservoir as a pressure standard for gauging the degree of brake application according to the degree of brake pipe reduction and degree of release of brake application according to the degree of restoration of brake pipe pressure, which valve device provides a novel means for maintaining hte desired degree of brake application by utilizing a restricted supply of fluid under pressure from a brake pipe to replenish that expended in supplying fluid under pressure to a brake cylinder device.

Having now described my invention, what I claim as new and desire to secure by Letters Patent, is:

1. In a fluid pressure brake apparatus, in combination, a brake pipe, a control reservoir, an auxiliary reservoir, a brake cylinder device, a brake controlling valve device controlled by pressure of fluid in said brake pipe and an opposing pressure corresponding to pressure of fluid in said control reservoir and operable by said opposing pressure upon a reduction in brake pipe pressure relative to said opposing pressure from a release position to a brake application position and comprising valve means operative to establish a main charging connection between said brake pipe and said auxiliary reservoir only when said valve device is in said release position, flow restricting means connecting said brake pipe to said auxiliary reservoir in by-passing relation to said main charging connection, a second valve means operative to connect said brake cylinder device to atmosphere when said valve device is in said release position and to close said atmospheric connection when said valve device is out of said release position, a third valve means operative to establish a principal communication between said auxiliary reservoir and said brake cylinder device only when said valve device is in said brake application position, said valve device being also operable in response to brake cylinder pressure to a lap position intermediate said release and application positions in which lap position said communication and said atmospheric and main charging connections are closed and operable in response to a certain reduction in brake cylinder pressure while said valve device is in said lap position to a brake application maintaining position, and valve means operative when said valve device is in said maintaining position to establish a restricted communication relative to and in parallel relation to said principal communication.

2. In a fluid pressure brake apparatus, in combination, a brake pipe, a control reservoir, an auxiliary reservoir, a brake cylinder device, a brake controlling valve device controlled by pressure of fluid in said brake pipe and an opposing pressure corresponding to pressure of fluid in said control reservoir and operative by said opposing pressure upon a reduction in brake pipe pressure relative to said opposing pressure from a brake release position to a brake application position, and operative by brake cylinder pressure from said application position to a lap position intermediate the aforesaid positions, and operative by control reservoir pressure from said lap position to a brake application maintaining position upon a reduction in said brake cylinder pressure, said brake controlling valve device comprising flow restricting means connecting said brake pipe to said auxiliary reservoir, one valve means operative in release position only to connect said brake pipe to said auxiliary reservoir, a second valve means operative to connect said brake cylinder device to atmosphere in release position only and to close said atmospheric connection in all other positions, a third valve means operative to supply fluid under pressure from said auxiliary reservoir to said brake cylinder device at a certain rate of flow in brake application position only and at a rate less than said certain rate in application maintaining position only, and resilient means urging said third valve means toward an inoperative position.

3. In a fluid pressure brake apparatus, in combination, a brake pipe, a control reservoir, an auxiliary reservoir, a brake cylinder device, a brake controlling valve device controlled by pressure of fluid in said brake pipe and an opposing pressure corresponding to pressure of fluid in said control reservoir and operative by said opposing pressure upon a reduction in brake pipe pressure relative to said opposing pressure from a brake release position to a brake application position, operative by brake cylinder pressure from said application position to a lap position intermediate the aforesaid positions and operative by control reservoir pressure from said lap position to a brake application maintaining position, said brake controlling valve device comprising a charging conduit for supplying fluid under pressure from said brake pipe to said auxiliary reservoir, valve means operative to open said conduit only in release position, a check valve interposed in said conduit between said brake pipe and said valve means for permitting flow of fluid under pressure only in the direction of said auxiliary reservoir, a second valve means operative to connect said brake cylinder device to atmosphere in release position only and to close said atmospheric connection in all other positions, and a third valve means operative to supply fluid under pressure from said auxiliary reservoir to said brake cylinder device at a certain rate of flow in brake application position only and at a rate less than said certain rate in application maintaining position only.

4. In a fluid pressure brake apparatus, in combination, a brake pipe, a control reservoir, an auxiliary reservoir, a brake cylinder device, a brake controlling valve device controlled by pressure of fluid in said brake pipe and an opposing pressure corresponding to pressure of fluid in said control reservoir and operative by said opposing pressure upon a reduction in brake pipe pressure relative to said opposing pressure from a brake release position to a brake application position, operative by brake cylinder pressure from said application position to a lap position intermediate the aforesaid positions and operative by control reservoir pressure from said lap position to a brake application maintaining position, said brake controlling valve device comprising a charging conduit for supplying fluid under pressure from said brake pipe to said auxiliary reservoir, valve means operative to open said conduit only in release position, a check valve interposed in said conduit between said brake pipe and said valve means for permitting flow of fluid under pressure only in the direction of said auxiliary reservoir, a flow restricting means in by-passing relation to said valve means, a second valve means operative to connect said brake cylinder device to atmosphere in release position only and to close said atmospheric connection in all other positions, and a third valve means operative to supply fluid under pressure from said auxiliary reservoir to said brake cylinder device at a certain rate of flow in brake application position only and at a rate less than said certain rate in application maintaining position only.

5. In a fluid pressure brake apparatus, in combination, a brake pipe, a control reservoir, an auxiliary reservoir, a brake cylinder device, a brake controlling valve device controlled by pressure of fluid in said brake pipe and an opposing pressure corresponding to pressure of fluid in said control reservoir and operative by said opposing pressure upon a reduction in brake pipe pressure relative to said opposing pressure from a brake release position to a brake application position, operative by brake cylinder pressure from said application position to a lap position intermediate the aforesaid positions and operative by control reservoir pressure from said lap position to a brake application maintaining position, said brake controlling valve device comprising a charging conduit for supplying fluid under pressure from said brake pipe to said auxiliary reservoir, valve means operative to open said conduit only in release position, a check valve interposed in said conduit between said brake pipe and said valve means for permitting flow of fluid under pressure only in the direction of said auxiliary reservoir, flow restricting means connecting the flow of fluid from said check valve to said auxiliary reservoir, a second valve means operative to connect said brake cylinder device to atmosphere in release position only and to close said atmospheric connection in all other positions, and a third valve means operative to supply fluid under pressure from said auxiliary reservoir to said brake cylinder device at a certain rate of flow in brake application position only and at a rate less than said certain rate in application maintaining position only.

References Cited in the file of this patent

FOREIGN PATENTS 668,122    Great Britain _____ Mar. 12, 1952